United States Patent [19]
Miller et al.

[11] 3,740,134
[45] June 19, 1973

[54] MEASURING SYSTEM

[75] Inventors: Walter Miller, Traunstein; Kurt Flichtinger, Traunreut, both of Germany

[73] Assignee: Dr. Johannes Heidenhain, Traunstein, Germany

[22] Filed: June 6, 1969

[21] Appl. No.: 830,948

[30] Foreign Application Priority Data
June 10, 1968   Germany.................. P 17 73 594.3

[52] U.S. Cl. ................................................. 353/41
[51] Int. Cl. ........................................... G03b 21/00
[58] Field of Search ..................... 353/40, 41, 42; 33/125

[56] References Cited
UNITED STATES PATENTS

| | | | |
|---|---|---|---|
| 3,059,709 | 10/1962 | Karp | 353/82 |
| 2,638,031 | 5/1953 | Stockwell | 353/41 |
| 2,959,087 | 11/1960 | Strickland | 353/41 |
| 3,031,923 | 5/1962 | Heidenhain | 353/41 |
| 3,106,127 | 10/1963 | Kollen | 33/125 |
| 3,166,626 | 1/1965 | Vargady | 353/40 |
| 3,238,838 | 3/1966 | Gottesmann | 353/41 |
| 3,363,963 | 1/1968 | Smith | 353/41 |

FOREIGN PATENTS OR APPLICATIONS

| | | | |
|---|---|---|---|
| 1,046,894 | 12/1958 | Germany | 353/41 |
| 931,042 | 7/1963 | Great Britain | 33/125 |
| 1,270,217 | 7/1961 | France | 33/125 |
| 978,078 | 12/1964 | Great Britain | 353/41 |

*Primary Examiner*—Leonard Forman
*Assistant Examiner*—Jason Mirabito
*Attorney*—Ernest G. Montague

[57] ABSTRACT

A measuring device including a scale and a reader including a viewing window which comprises means for a fine division of the intervals of a measuring division, the measuring system has at least two divisions of different measures, and the latter is arranged on one side of the scale adjacent each other.

1 Claim, 5 Drawing Figures

Patented June 19, 1973
3,740,134
2 Sheets-Sheet 1
FIG. 1.
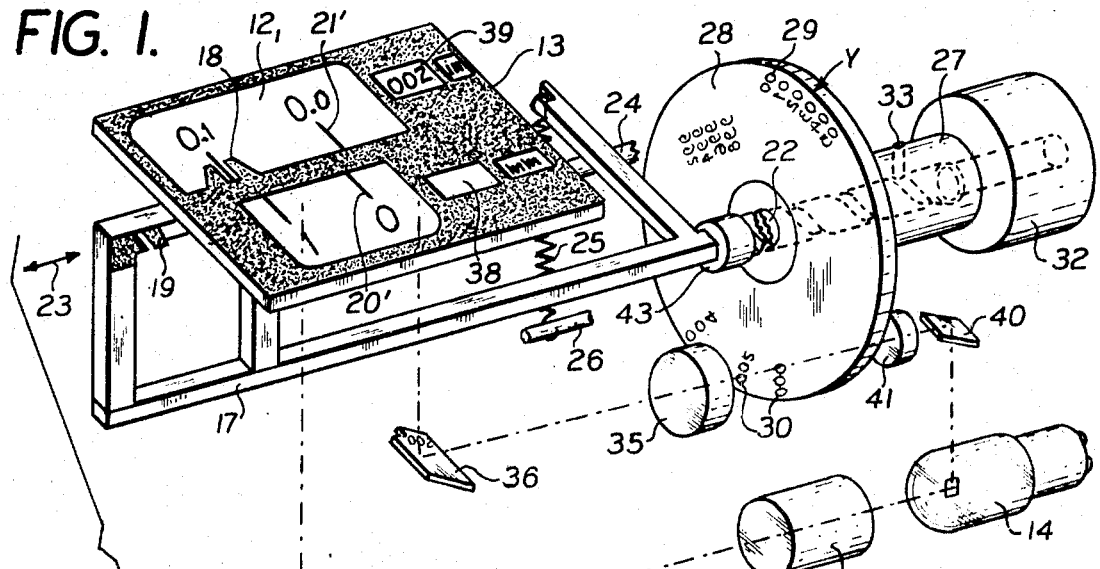
FIG. 2.
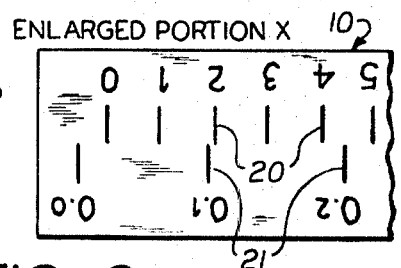
FIG. 3.
ENLARGED PORTION X
FIG. 5.
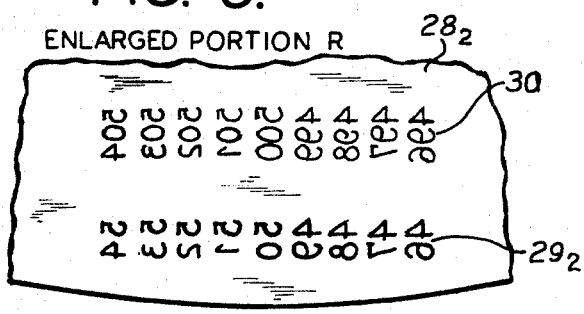
ENLARGED PORTION R
WALTER MILLER
KURT FEICHTINGER
BY
ATTORNEY.

INVENTORS
WALTER MILLER
KURT FEICHTINGER
BY
ATTORNEY.

MEASURING SYSTEM

The present invention relates to a measuring device, in general, and to such measuring device comprising a scale and a reading device, in particular, in which means are provided for a fine division of the intervals of the measuring division.

It is known in measuring systems of the above-described type to provide as catching means for the line markings of the scale, a fork, a spiral or the like, which is measurably displaceable in the viewing window, i.e., the movable path of the forks, etc. is measured within the range of an interval of the scale and the displacement-or-rotation-amount is readable in form of numbers.

With known measuring systems, however, only divisions of the same measuring system can be read.

It is one object of the present invention to provide a measuring system which avoids the drawbacks of the known measuring systems.

It is another object of the present invention to provide a measuring system, wherein with simple means it is brought about that the devices having a high reading exactness are applicable in different ways, without requiring any rearrangements on the device at which the measuring system is applied.

It is still another object of the present invention to provide a measuring device, wherein the measuring device has at least two divisions of different measuring systems, which are arranged on one side of the scale body disposed adjacent each other.

One of the mentioned two measuring divisions of the different measuring systems can thereby be a metric division, while the other measuring division can be an inch division, which can be read selectively with one and the same device. Furthermore, with the reader, designed in accordance with the present invention, measuring divisions with equal division intervals, however, different direction, can be read. In a suitable embodiment of the present invention, for each measurably displaceable catching means there can be provided also a separate row of numbers indicating the fine values, which, for instance, can be mounted on a disc, drum or the like, coupled with the catching means and their adjusting member, respectively.

With these and other objects in view, which will become apparent in the following detailed description, the present invention, which is shown by example only, will be clearly understood in connection with the accompanying drawings, in which:

FIG. 1 is a perspective view of a first embodiment of the reading device designed in accordance with the present invention, which is suitable for the reading of metric divisions, as well as for the reading of inch divisions;

FIG. 2 is a section "X," at an enlarged scale, of FIGS. 1 and 7;

FIG. 3 is a section "Y" of FIG. 1;

FIG. 5 shows an enlarged section "R" of FIG. 4.

Figure 4:
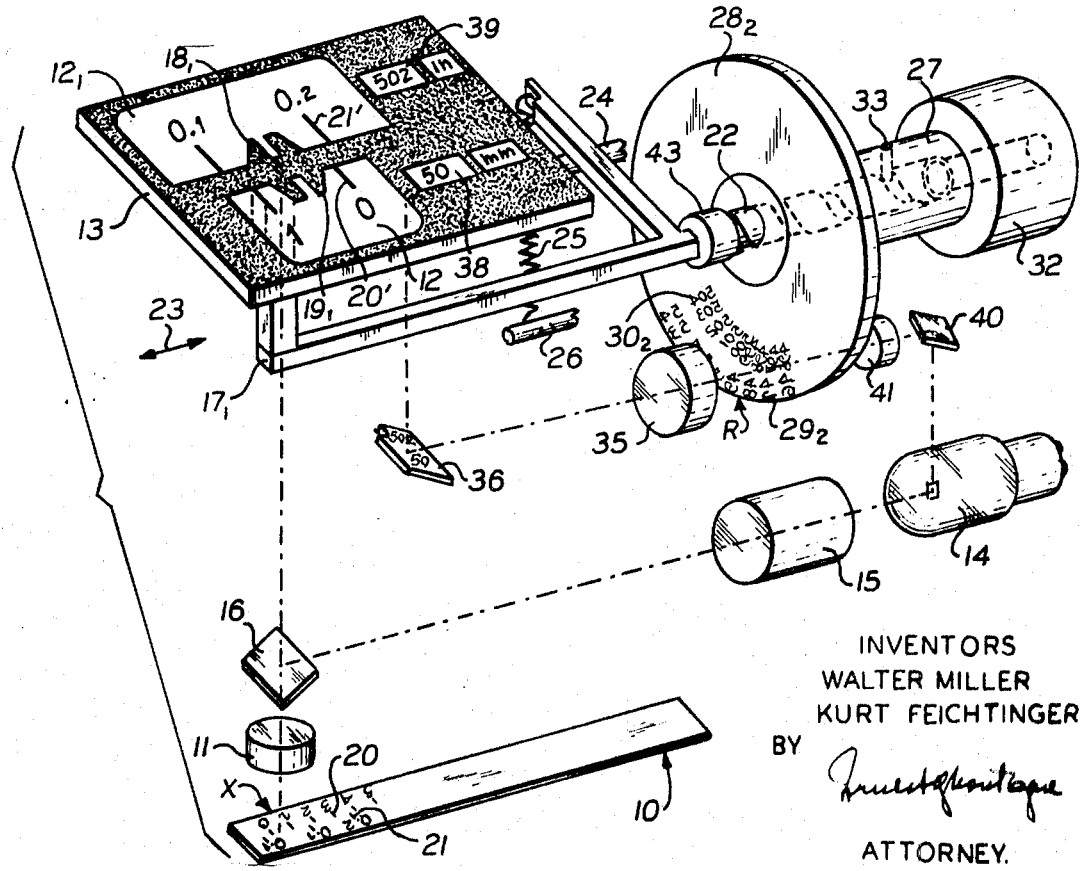
FIG. 4 is a perspective view of a third embodiment of the reading device designed in accordance with the present invention for the selective reading of metrical divisions and inch divisions.

Referring now to the drawings, and in particular to FIGS. 1 – 3, the measuring device comprises optical readers, which are suitable in accordance with the present invention for reading of measuring divisions of different measuring systems. Such optical readers can be used for setting or reading of the displacing path of two parts, for instance, of a machine slide relative to a machine bed.

Referring now to FIGS. 1 – 3, a section of a measuring band 10 to be read is optically imaged by means of an objective 11 enlarged into a viewing window 12 and $12_1$ of a screen 13. The section of the measuring band 10 to be read is illuminated by means of a light source 14 and a condenser 15 over a partly permeable mirror 16. The measuring band 10 can be secured in conventional manner in a carrier body, not shown in the drawing.

In FIG. 1 are provided, for instance, on the measuring band 10 two measuring divisions of different measuring systems, and in particular a metrical division 20 and an inch division 21. For catching the marker images 20' and 21' of the measuring divisions 20 and 21, two forks 18 and 19 are provided on the bottom side of the screen 13, which are secured on a joint fork carrier 17, which, for instance, by means of a threaded spindle 22 is displaceable in the direction of the arrow 23. For guidance of the fork carrier 17 a guide rod 24 can be provided on which the carrier 17 slides and which is secured in the housing of the device (not shown). A spring 25 pushes an arm of the fork carrier 17 against the guide rod 24. The spring 25 is secured to a holding pin 26, which likewise is secured in the housing of the device. A sleeve 27, in which the threaded spindle 22 is slidingly fitted without play, is the carrier of a transparent disc 28, which is equipped with rows of numbers 29 and 30 for each measuring system. The sleeve 27 is rotatably mounted in the housing of the device, however, immovably secured in axial direction. The disc 28 equipped with the rows of numbers 29 and 30 is rotatable by means of a rotary knob 32, which is rigidly secured with the sleeve 27. A driver pin or set screw 33 pressed into the sleeve 27 engages the thread groove of the spindle 22 and causes during rotation of the sleeve 27 an axial displacement of the threaded spindle 22, which is coupled with the carrier 17 for the forks 18 and 19 by means of a nut 43.

In FIG. 1, a section to be read of the rows of interpolation values or numbers 29 or 30 provided on the disc 28 is advantageously optically imaged enlarged into the viewing windows 38 or 39 of the screen 13 by means of an objective 35 over a mirror 36. The section to be read of the row of numbers 29 or 30 of the disc 28 is illuminated by the light source 14 by means of a mirror 40 and a condenser 41.

The number rows 29 and 30 provided on the transparent disc 28 assume in FIG. 1 in accordance with the present invention different angular ranges, so that with one and the same threaded spindle 22 or a cam disc, different, large division intervals of the measuring divisions 20 and 21 can be subdivided. In FIG. 1, for instance, where the inch division 21 is to be read, a section of the number row 30 is imaged into the viewing window 39, which is provided next to the viewing window $12_1$ for the numbered marker images 21' of the inch division 21 in the screen 13. If the disc 38 is rotated in an angular range, which is assumed for instance by the number row 30, then the fork 18 passes through an optically enlarged interval of the inch division 21. By the displacement of the forks 18 and 19 in measuring direction, it is obtained in FIG. 1, that always only a section of the number row 29 or 30 of the disc 28 appears in the reading field 38 or 39 of the screen 13.

If, with the reading device in accordance with the present invention, for instance, an inch division is to be read, as it is the case in FIG. 1, then the disc 28 must be rotated so far, until the fork 18 and thus also an image of the number row 30 appears in the reading field 12₁ and 39 of the screen 13, respectively. Thereafter, the fork 18 is set symmetrically onto the numbered marker image 21' and the measuring value is read in the reading field 12₁ and 39, which amounts in FIG. 1, by example, to 0.1002 inches.

During reading of a metrical division 20, the disc 28 in FIG. 1 must be turned so far, until the fork 19 appears in the reading field 12 of the screen 13, which is then set symmetrically on a numbered marker image 20' of the measuring division 20. Thereafter, the measuring value can be read in number form in the reading field 12 and 38 of the screen 13.

In FIGS. 4 and 5, deviating from FIG. 1, the forks 18₁ and 19₁ are provided crosswise to the measuring direction disposed one behind the other of a carrier 17₁. Furthermore, in FIG. 4, are provided on the disc 28₂ the rows of numbers 29₂ and 30₂ assuming the different angular ranges, and disposed next to each other in radial direction, so that sections of the rows of numbers 29₂ and 30₂ are imaged optically into the viewing windows 38 and 39 of the screen 13. Additional markings characterizing the measuring systems to be read, which may be provided to the right next to the viewing windows 38 and 39 in the screen assure a well arranged and well defined reading of the measuring values.

As catching means for the line markers of different divisions of different measuring systems, instead of forks, as a matter of course, also spiral-shaped markers or the like can be applied, the carrier body of which is rotatably disposed directly in the reading field of the device in conventional manner and the amount of rotation is readable in number form. Reading devices with spiral-shaped markings can, for instance, be formed such, that on one half of the carrier body arranged rotatably in the viewing window in numbers a numbered marking for a fine division of metrical measuring divisions is provided, while on the other half of the mentioned rotatable carrier body, a numbered spiral-shaped marking for fine division of inch divisions is provided.

It is also possible to couple the carrier body for the spiral-shaped markings or the displacement member for the catching forks with a known mechanical counter, on the number rollers of which the amount of rotation of the spiral-shaped marker or the displacement amount of the catching forks can be read.

The reading devices according to the present invention for measuring divisions are, of course, also usable for the reading of circular divisions of different measuring systems.

While we have disclosed several embodiments of the present invention, it is to be understood that these embodiments are given by example only and not in a limiting sense.

We claim:

1. A measuring device including a scale having markings and a reader for reading said scale, comprising
   said reader including two viewing windows and means for interpolation between adjacent markings of said scale,
   said markings on said scale forming two divisions comprising a metric division and an inch division disposed on one side of said scale adjacent each other,
   a single objective disposed for simultaneously optically imaging a portion of both of said two divisions into said two viewing windows, respectively,
   a carrier movably displaceable relative to said two viewing windows and having thereon two fork means viewable simultaneously through said two viewing windows in said reader for location of the markings of said metric division and said inch division, respectively,
   said interpolation means includes,
   one rotatable disc means coupled with said movably displaceable carrier, such that movement of one corresponds with movement of the other, said rotatable disc means having thereon two series of numbers disposed at different angular ranges on said rotatable disc means so that with said movably displaceable carrier, divisions of either said metric division or of said inch division can be read, said two series of numbers being radially adjacent each other in two adjacent annular portions, respectively, of said disc means,
   said reader including two interpolation windows adjacent said two viewing windows, respectively, and
   a single optic disposed for optically imaging one of said numbers of each of said two series of numbers into said two interpolation windows, respectively.

* * * * *